United States Patent
Alodeh

(10) Patent No.: US 12,119,899 B2
(45) Date of Patent: Oct. 15, 2024

(54) DOWNLINK SYMBOL-LEVEL PRECODING AS PART OF MULTIUSER MISO COMMUNICATION

(71) Applicant: Telefonaktiebolaget LM Ericsson (publ), Stockholm (SE)

(72) Inventor: Maha Alodeh, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 29 days.

(21) Appl. No.: 18/022,790

(22) PCT Filed: Sep. 16, 2020

(86) PCT No.: PCT/SE2020/050863
§ 371 (c)(1),
(2) Date: Feb. 23, 2023

(87) PCT Pub. No.: WO2022/060260
PCT Pub. Date: Mar. 24, 2022

(65) Prior Publication Data
US 2023/0361820 A1    Nov. 9, 2023

(51) Int. Cl.
*H04B 7/0456* (2017.01)
*H04B 7/0452* (2017.01)
*H04L 27/36* (2006.01)

(52) U.S. Cl.
CPC ......... *H04B 7/0456* (2013.01); *H04B 7/0452* (2013.01); *H04L 27/36* (2013.01)

(58) Field of Classification Search
CPC ...... H04B 7/0456; H04B 7/0452; H04L 27/36
See application file for complete search history.

(56) References Cited

U.S. PATENT DOCUMENTS

| 5,515,378 A | 5/1996 | Roy, III et al. |
| 2020/0014438 A1* | 1/2020 | Alodeh ............. H04L 25/03343 |

FOREIGN PATENT DOCUMENTS

| WO | 2017050930 A1 | 3/2017 |
| WO | 2018158346 A1 | 9/2018 |

OTHER PUBLICATIONS

International Search Report and the Written Opinion of the International Searching Authority, issued in corresponding International Application No. PCT/SE2020/050863, dated My 28, 2021, 13 pages.

(Continued)

*Primary Examiner* — Vineeta S Panwalkar
(74) *Attorney, Agent, or Firm* — Rothwell, Figg, Ernst & Manbeck, P.C.

(57) ABSTRACT

There is provided mechanisms for downlink symbol-level precoding as part of multiuser MISO communication. A method is performed by a network node. The method comprises obtaining a data vector of a current time instant to be precoded. The data vector comprises data symbols for 1 users. The current time instant corresponds to a single symbol. The method comprises precoding the obtained data vector by determining an output vector for the data vector of the current time instant. Determining the output vector for the current time instant comprises searching for a data vector of a previous time instant that is co-linear with the data vector of the current time instant according to a co-linearity factor. When such a data vector of the previous time instant is found, the output vector is equal to an output vector of the previous time instant multiplied with the co-linearity factor.

17 Claims, 10 Drawing Sheets

(56) References Cited

OTHER PUBLICATIONS

Li et al. "A Tutorial on Interference Exploitation via Symbol-Level Precoding: Overview, State-of-the-Art and Future Directions" IEEE Communications Surveys & Tutorials, vol. 22, No. 2, Second Quarter 2020, pp. 796-839.
Alodeh et al. "Constructive Multiuser Interference in Symbol Level Precoding for the MISO Downlink Channel" IEEE Transactions on Signal Processing, vol. 63, No. 9, May 1, 2015, pp. 2239-2252.
Alodeh et al. "A Multicast Approach for Constructive Interference Precoding in MISO Downlink Channel" 2014 IEEE International Symposium on Infomation Theory, pp. 2534-2538.
Alodeh et al. "Energy-Efficient Symbol-Level Precoding in Multiuser MISO Based on Relaxed Detection Region" IEEE Transactions On Wireless Communications, vol. 15, No. 5, May 2016, pp. 3755-3767.
Bengtsson et al. "Optimal and suboptimal transmit beamforming" Jan. 2001, https://www.researchgate.net/publication/243767897, 34 pages.
Björnson et al. "Optimal Multiuser Transmit Beamforming: A Difficult Problem with a Simple Solution Structure" IEEE Signal Processing Magazine, Jun. 13, 2014, pp. 142-148.
Spencer et al. "Zero-Forcing Methods for Downlink Spatial Multiplexing in Multiuser MIMO Channels" IEEE Transactions on Signal Processing, vol. 52, No. 2, Feb. 2004, pp. 461-471.
Zetterberg et al. "The Spectrum Efficiency of a Base Station Antenna Array System for Spatially Selective Transmission" IEEE Transactions on Vehicular Technology, vol. 44, No. 3, Aug. 1995, pp. 651-660.
Masouros et al. "Dynamic Linear Precoding for the Exploitation of Known Interference in MIMO Broadcast Systems" IEEE Transactions on Wireless Communications, vol. 8, No. 3, Mar. 2009, pp. 1396-1404.
Masouros "Correlation Rotation Linear Precoding for MIMO Broadcast Communications" IEEE Transactions on Signal Processing, vol. 59, No. 1, Jan. 2011, pp. 252-262.
Alodeh et al. "Symbol-Level Multiuser MISO Precoding for Multi-Level Adaptive Modulation" IEEE Transactions on Wireless Communications, vol. 16, No. 8, Aug. 2017, pp. 5511-5524.
Spano et al. "Symbol-Level Precoding for the Nonlinear Multiuser MISO Downlink Channel" IEEE Transactions on Signal Processing, vol. 66, No. 5, Mar. 1, 2018, pp. 1331-1345.
Spano et al. "Faster-Than-Nyquist Signaling Through Spatio-Temporal Symbol-Level Precoding for the Multiuser MISO Downlink Channel" IEEE Transactions on Wireless Communications, vol. 17, No. 9, Sep. 2018, pp. 5915-5928.
Alodeh et al. "Faster-Than-Nyquist Spatiotemporal Symbol-Level Precoding in the Downlink of Multi User MISO Channels" 2017 IEEE, pp. 3779-3783.
Spano et al. "Papr Minimization Through Spatio-Temporal Symbol-Level Precoding for the Non-Linear Multi-User MISO Channel" 2018 IEEE, pp. 3599-3603.
Alodeh et al. "Symbol-Level and Multicast Precoding for Multiuser Multiantenna Downlink: A State-of-the-Art, Classification, and Challenges" IEEE Communications Surveys & Tutorials, vol. 20, No. 3, Third Quarter 2018, pp. 1733-1757.
Baghdady "Directional Signal Modulation by Means of Switched Spaced Antennas" IEEE Transactions on Communications, vol. 38, No. Apr. 4, 1990, pp. 399-403.
Daly et al. "Directional Modulation Technique for Phased Arrays" IEEE Transactions on Antennas and Propagation, vol. 57, No. 9, Sep. 2009, pp. 2633-2640.
Li et al. "Interference Exploitation Precoding Made Practical: Optimal Closed-Form Solutions for PSK Modulations" IEEE Transactions on Wireless Communications, vol. 17, No. 11, Nov. 2018, pp. 7661-7676.
Sidiropoulos et al. "Transmit Beamforming for Physical-Layer Multicasting" IEEE Transactions on Signal Processing, vol. 54, No. 6, Jun. 2006, pp. 2239-2251.
Tran et al. "A Conic Quadratic Programming Approach to Physical Layer Multicasting for Large-Scale Antenna Arrays" IEEE Signal Processing Letters, vol. 21, No. 1, Jan. 2014, pp. 114-117.
Karipidis et al. "Quality of Service and Max-Min Fair Transmit Beamforming to Multiple Cochannel Multicast Groups" IEEE Transactions on Signal Processing, vol. 56, No. 3, Mar. 2008, pp. 1268-1279.
Karipidis et al. "Far-Field Multicast Beamforming for Uniform Linear Antenna Arrays" IEEE Transactions on Signal Processing, vol. 55, No. 10, Oct. 2007, pp. 4916-4927.
Alodeh et al., "Constructive Multiuser Interference in Symbol Level Precoding for the MISO Downlink Channel", arxiv.org, Cornell University Library, 201 Olin Library Cornell University Ithaca, NY 14853, Aug. 20, 2014 (Aug. 20, 2014) (32 pages).
Alodeh et al., "Symbol-Level Multiuser MISO Precoding for Multi-level Adaptive Modulation: A Multicast View", arxiv.org, Cornell University Library, 201 Olin Library Cornell University Ithaca, NY 14853, Jan. 12, 2016 (Jan. 12, 2016) (29 pages).
Alodeh et al., "User Selection for Symbol-Level Multigroup Multicasting Precoding in the Downlink of MISO Channels", 2018 IEEE International Conference on Communications (ICC), IEEE, May 20, 2018 (May 20, 2018), pp. 1-7.

* cited by examiner

DOWNLINK SYMBOL-LEVEL PRECODING AS PART OF MULTIUSER MISO COMMUNICATION

CROSS REFERENCE TO RELATED APPLICATION(S)

This application is a 35 U.S.C. § 371 National Phase Entry Application from PCT/SE2020/050863, filed Sep. 16, 2020, designating the United States the disclosures of which is incorporated herein by reference in its entirety.

TECHNICAL FIELD

Embodiments presented herein relate to a method, a network node, a computer program, and a computer program product for downlink symbol-level precoding as part of multiuser multiple-input single-output (MISO) communication.

BACKGROUND

In communications networks, there may be different challenges. One such challenge is energy consumption. Research and development is ongoing for identifying techniques that enable the energy consumption to be reduced, without compromising quality or performance in terms of throughput, quality of service, etc.

On the other hand, new services require higher and higher data rates. There is thus a need for energy-efficient devices that are capable of processing high data rates. Physical-layer techniques such as Multiple Input Multiple Output (MIMO) systems and orthogonal frequency-division multiplexing (OFDM) as utilized as an air-interface in Long Term Evolution (LTE) telecommunication systems and advanced fourth generation (4G) telecommunication systems will continue to play a role in fifth generation (5G) telecommunication systems, such as new radio (NR).

The wireless channel of the air-interface fluctuates randomly with time, frequency and space, which limits the communication capacity and reliability. This poses a challenge for obtaining effective communication, especially if also taking aspects of energy consumption into consideration. In an environment of non-stationary wireless channels where transmitters and receivers are relatively mobile, knowledge of the radio propagation environment is crucial to the design of communication system as the non-stationarity of the wireless channels impairs the reception drastically. In this respect, symbol-level precoding (SLP) exploits the interference in the downlink of multiuser MISO systems.

SLP can be implemented by determining the output vectors symbol-by-symbol, which could lead to a better understanding of the interference nature and structure. In SLP, the output vector is designed to guarantee that each symbol should be received in the correct detection region without any phase rotation. In symbol-level unicast precoding the (radio) access network node communicates individual messages for each user. In SLP the interference can be classified into either constructive interference or destructive interference. This classification enables interference exploitation among multiple transmitted data streams. However, SLP is based on jointly optimizing the precoding and the constellation rotation. The constellation rotation has a higher impact at low modulation order and still has influential saving at higher modulation orders if the channel exhibits spatial correlation. This optimization procedure is as such computationally intensive.

Hence, there is a need for a computationally efficient SLP scheme.

SUMMARY

An object of embodiments herein is to provide symbol-level precoding that is less computationally intensive than existing SLP schemes.

According to a first aspect there is presented a method for downlink symbol-level precoding as part of multiuser MISO communication. The method is performed by a network node. The method comprises obtaining a data vector of a current time instant to be precoded. The data vector comprises data symbols for K>1 users. The current time instant corresponds to a single symbol. The method comprises precoding the obtained data vector by determining an output vector for the data vector of the current time instant. Determining the output vector for the current time instant comprises searching for a data vector of a previous time instant that is co-linear with the data vector of the current time instant according to a co-linearity factor. When such a data vector of the previous time instant is found, the output vector is equal to an output vector of the previous time instant multiplied with the co-linearity factor.

According to a second aspect there is presented a network node for downlink symbol-level precoding as part of multiuser MISO communication. The network node comprises processing circuitry. The processing circuitry is configured to cause the network node to obtain a data vector of a current time instant to be precoded. The data vector comprises data symbols for K>1 users. The current time instant corresponds to a single symbol. The processing circuitry is configured to cause the network node to precode the obtained data vector by determining an output vector for the data vector of the current time instant. Determining the output vector for the current time instant comprises searching for a data vector of a previous time instant that is co-linear with the data vector of the current time instant according to a co-linearity factor. When such a data vector of the previous time instant is found, the output vector is equal to an output vector of the previous time instant multiplied with the co-linearity factor.

According to a third aspect there is presented a network node for downlink symbol-level precoding as part of multiuser MISO communication. The network node comprises an obtain module configured to obtain a data vector of a current time instant to be precoded. The data vector comprises data symbols for K>1 users. The current time instant corresponds to a single symbol. The network node comprises a precode module configured to precode the obtained data vector by determining an output vector for the data vector of the current time instant. Determining the output vector for the current time instant comprises searching for a data vector of a previous time instant that is co-linear with the data vector of the current time instant according to a co-linearity factor. When such a data vector of the previous time instant is found, the output vector is equal to an output vector of the previous time instant multiplied with the co-linearity factor.

According to a fourth aspect there is presented a computer program for downlink symbol-level precoding as part of multiuser MISO communication, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide symbol-level precoding that is less computationally intensive than existing SLP schemes.

Advantageously, these aspects provide symbol-level precoding with improved energy efficiency without affecting the symbol error rate or the detection process.

Advantageously, these aspects enable the symbol-level precoding to optimize the transmit precoding and the constellation rotation without additional processing at the receiver side. This exploits the constellation rotation for each user to improve the general symbols alignment. Therefore, more constructive interference is expected to be utilized in achieving higher energy efficiency.

Advantageously, these aspects enable a reduction in computational complexity by means of decreasing the number of the optimization problems to be solved or the number of constraints to consider in a single optimization problem.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
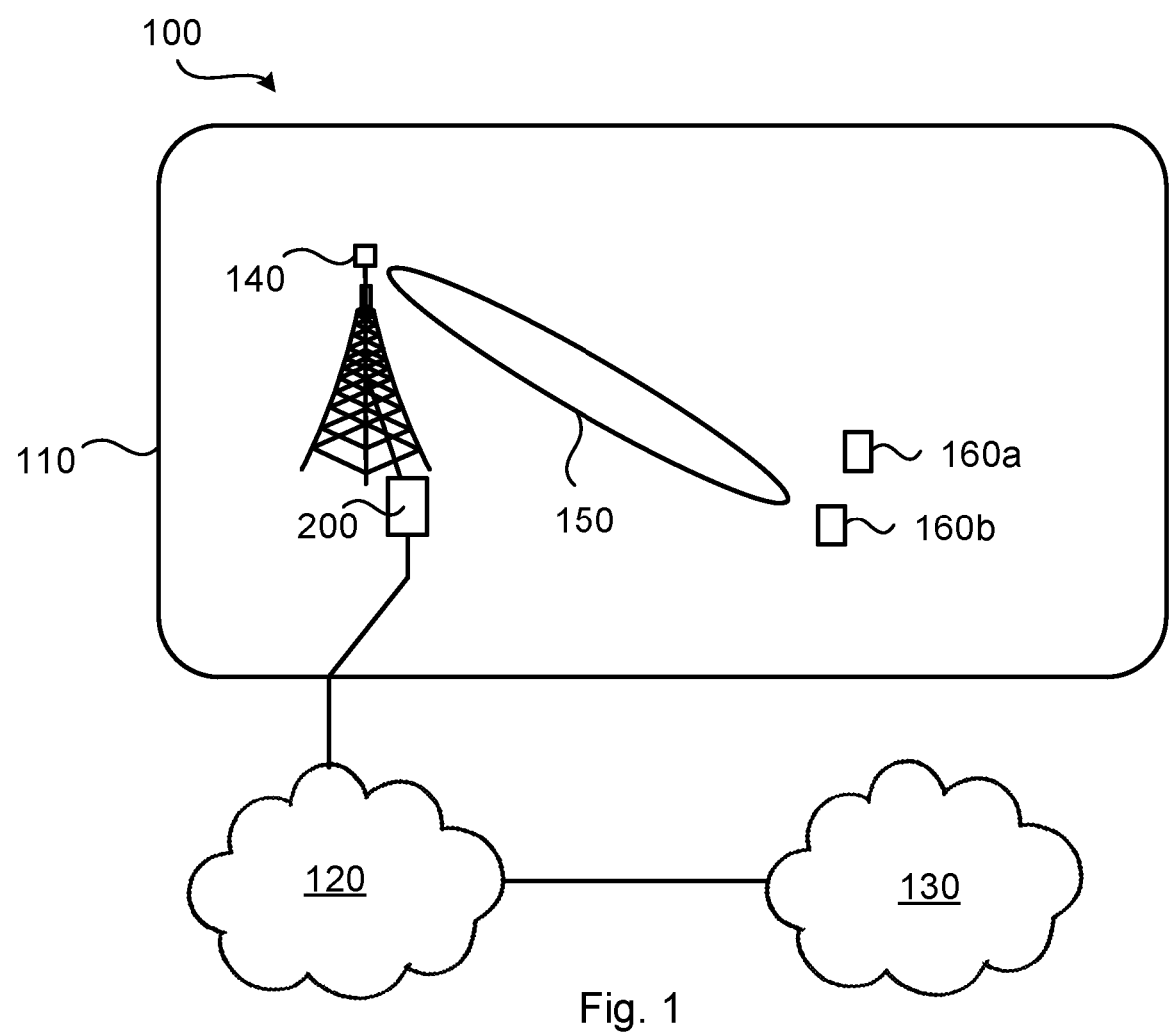
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, a fifth generation (5G) telecommunications network, or any evolvement thereof, and support any 3GPP telecommunications standard, where applicable.

The communication networks 100 comprises a transmission and reception point (TRP) 140 configured to provide network access to users, as represented by users 160a, 160b, in a (radio) access network 110. The (radio) access network 110 is operatively connected to a core network 120. The core network 120 is in turn operatively connected to a service network 130, such as the Internet. The users 160a, 160b are thereby enabled to, via the TRP 140, access services of, and exchange data with, the service network 130. The TRP 140 comprises, is collocated with, is integrated with, or is in operational communications with, a network node 200. The network node 200 (via its TRP 140) and the users 160a, 160b are configured to communicate with each other in beams, one of which is illustrated at reference numeral 150. Which beam to use is determined through precoding. In some aspects the communications network 100 is a multiuser unicast MIMO system where the network node 200 (via its TRP 140) transmits multiple independent data streams to multiple users 160a, 160b over the same set of time-frequency resources (or resource elements) by relying on channel state information to exploit the spatial dimension.

Examples of network nodes 200 are (radio) access network nodes, radio base stations, base transceiver stations, Node Bs, evolved Node Bs, g NBs, access points, access nodes, and backhaul nodes. Examples of users 160a, 160b are wireless devices, mobile stations, mobile phones, handsets, wireless local loop phones, user equipment (UE), smartphones, laptop computers, tablet computers, network equipped sensors, network equipped vehicles, and so-called Internet of Things devices.

As noted above there is a need for a computationally efficient SLP scheme.

In this respect, one bottleneck of employing SLP in current communication systems is the number of calculations needed. In general terms, the number of calculations is a function of channel state information and the number of possible data vectors per channel realization. The number of possible output vector calculations equals to $2^{\Sigma_j m_j}$ in for each channel realization or $2^{\Sigma_j m_j+1}$ constraints in the single optimization problem interpretation, where $m_j$ is the modulation order for user j. This leads to huge computational complexity, especially for large number of users and/or high modulation orders. Assuming a low doppler channel model with relatively flat or frequency non-selective fading, the herein disclosed embodiments provide low complexity techniques to determine the beamforming weights for all the users in a scheduled user set based on uplink channel estimates.

The embodiments disclosed herein in particular relate to mechanisms for downlink symbol-level precoding as part of multiuser MISO communication. In order to obtain such mechanisms there is provided a network node 200, a method performed by the network node 200, a computer program product comprising code, for example in the form of a computer program, that when run on a network node 200, causes the network node 200 to perform the method.

Figure 2:
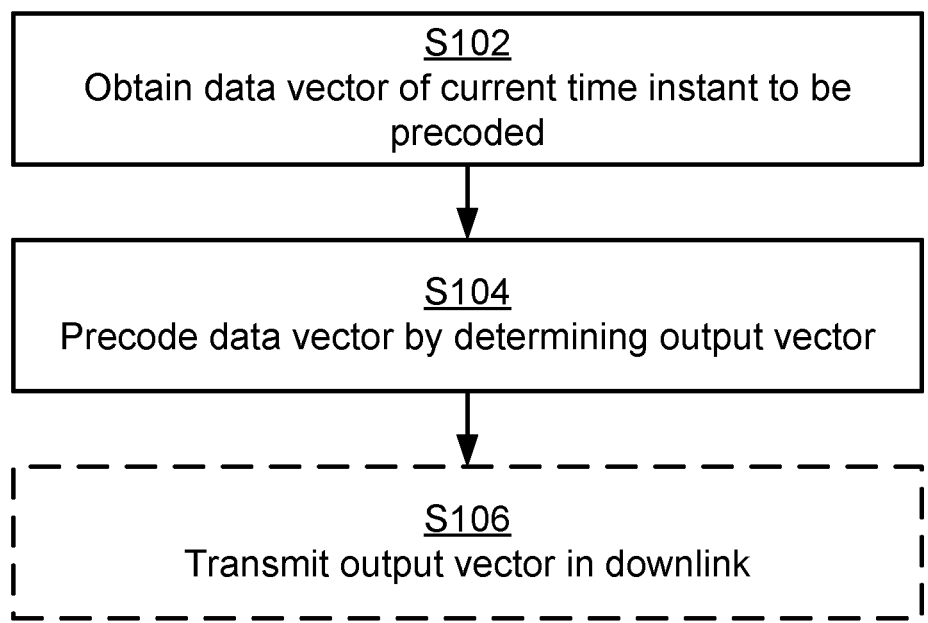
FIG. 2 is a flowchart of methods according to embodiments.

FIG. 2 is a flowchart illustrating embodiments of methods for downlink symbol-level precoding as part of multiuser MISO communication. The methods are performed by the network node 200. The methods are advantageously provided as computer programs 1020.

It is assumed that data for K>1 users 160a, 160b is to be precoded for a current time instant, n. Hence, the network node 200 is configured to perform step S102:

S102: The network node 200 obtains a data vector, d[n], of a current time instant, n, to be precoded. The data vector comprises data symbols, $d_1[n], \ldots, d_K[n]$, for K>1 users 160a, 160b. The current time instant corresponds to a single symbol. Thus, $d[n]=[d_1[n], \ldots, d_K[n]]^T$, where $d_j[n]$ is the data symbol for user j at time instant n, such that the vector d[n] is formed as a concatenation of the symbols from all users to be served simultaneously at time instant n.

The data vector d[n] is then precoded to an output vector x[n]. In particular, the network node 200 is configured to perform step S104:

S104: The network node 200 precodes the obtained data vector by determining an output vector, x[n], for the data vector of the current time instant n. Determining the output vector x[n] for the current time instant comprises searching for a data vector d[m] of a previous time instant, m, that is co-linear with the data vector d[n] of the current time instant according to a co-linearity factor. When such a data vector of the previous time instant is found, the output vector x[n] is equal to an output vector x[m] of the previous time instant m multiplied with the co-linearity factor.

Figure 3:
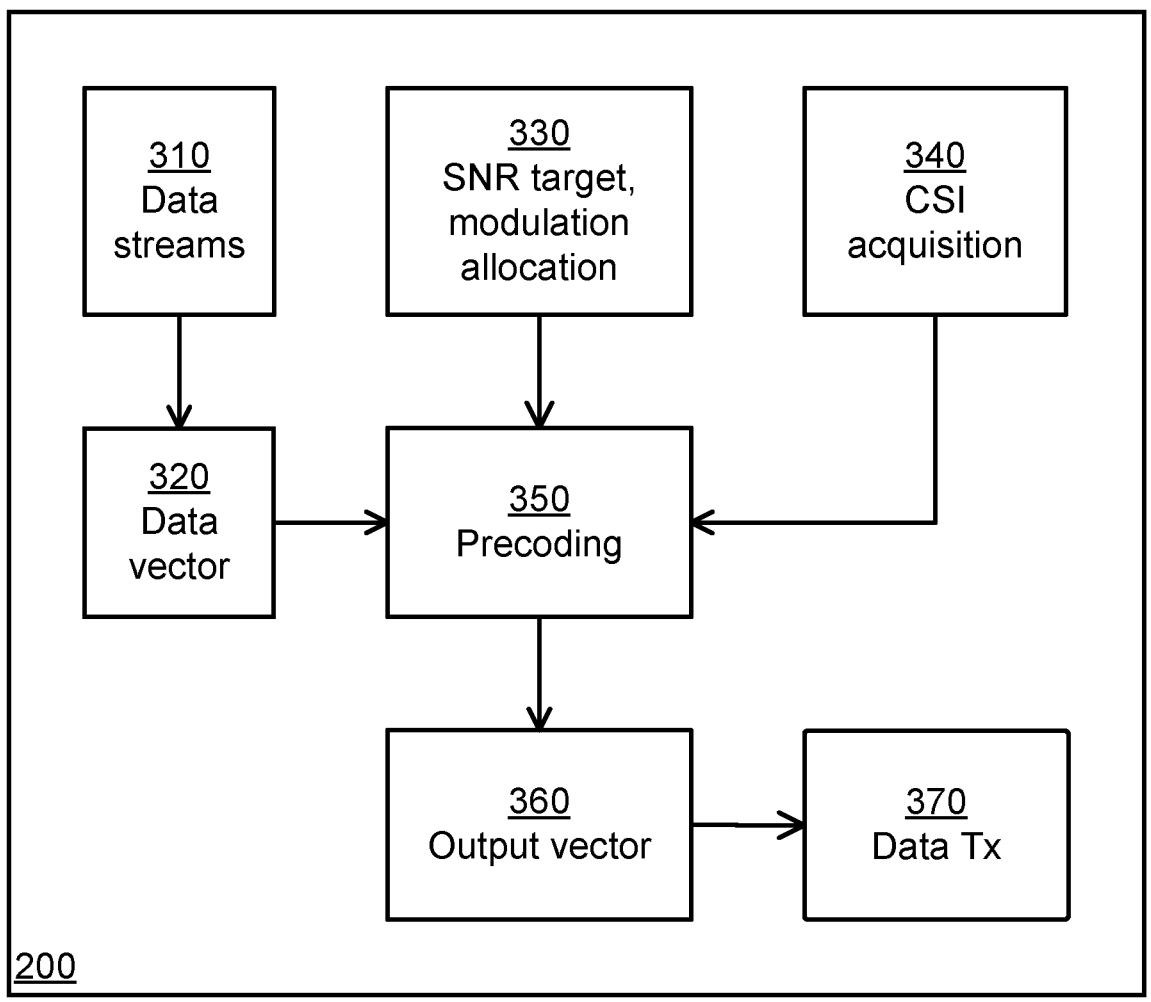
FIGS. 3, 4, and 6 are block diagrams according to embodiments.

Reference is here made to the block diagram of the network node 200 in FIG. 3. Data to be precoded is represented by a data stream block 310. The data is in a data vector block 320 mapped to data vectors, one data vector per time instant. The data vectors are fed to a precoding block 350 where, for a given data vector d[n] of the current time instant, a corresponding output vector x[n] is determined. The thus determined output vectors, one per each time instant, are represented by an output vector block 360. Transmission of the output vectors is represented by a data transmission (Tx) block 370. Description of the SNR target and modulation allocation block 330 and the CSI acquisition block 340 will be provided below.

Embodiments relating to further details of downlink symbol-level precoding as part of multiuser MISO communication as performed by the network node 200 will now be disclosed.

In some aspects, once the data vector d[n] has been precoded into the output vector x[n], the output vector x[n] is transmitted. The output vector x[n] might be transmitted by the network node 200, or at least transmission of the output vector x[n] is initiated by the network node 200. That is, in some embodiments, the network node 200 is configured to perform (optional) step S106:

S106: The network node 200 transmits the output vector x[n] of the current time instant n in the downlink.

There could be different ways to co-linearity factor, hereinafter denoted ζ. In some embodiments, the data vector d[m] of the previous time instant is co-linear with the data vector d[n] of the current time instant when the data vector d[n] of the current time instant is equal to the co-linearity factor multiplied with the data vector d[m] of the previous time instant. That is, d[n] is co-linear with d[m] only when d[n]=ζ·d[m].

There could be different examples of numerical values of the co-linearity factor ζ. In some examples the co-linearity factor takes a value in a set Z={1, −1, i, −i}. That is ζ∈Z.

As disclosed above, determining the output vector x[n] for the current time instant comprises searching for a data vector d[m] of a previous time instant m. There could be different ways for the network node 200 to search for this data vector d[m]. In some embodiments, the data vector d[m] of the previous time instant is searched for among data vectors in a look-up table.

Figure 4:
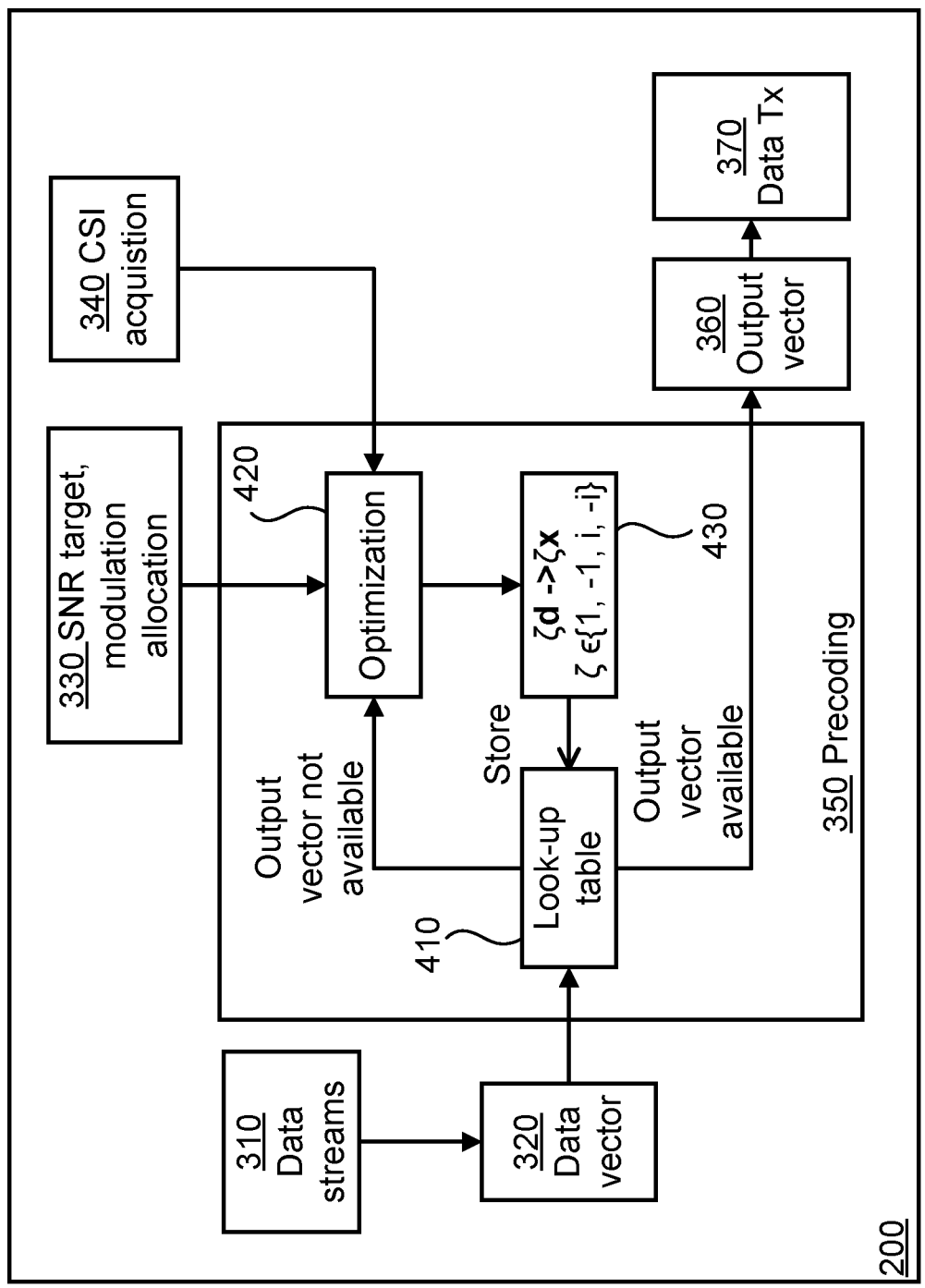

Aspects of the precoding will now be disclosed. Reference is here made to the block diagram of the network node 200 in FIG. 4. In this respect, the data stream block 310, the data vector block 320, the output vector block 360, and the data Tx block 370 have already been described with reference to FIG. 3 and a thus repeated description is therefore omitted.

In general terms, in the precoding block 350, for a given data vector d[n] of the current time instant, a corresponding data vector d[m] of the previous time instant is searched for in a look-up table 410.

There could be different ways to populate the look-up table with data vectors. In general terms, the output vectors are, together with their respective data vectors, added to the look-up table upon having been determined through an optimization procedure, as represented by an optimization block 420. In this respect, there could be different alternatives as to when in time the look-up table is populated with data vectors. According to a first alternative, the look-up table is built on the fly as the data vectors are precoded into output vectors. That is, in some embodiments, the optimization procedure is performed as the data vectors are precoded. When any data vector of a previous time instant that is co-linear with the data vector of the current time instant cannot be found (represented by the arrow labelled output vector not available) when the data vector of the current time instant is to be precoded, the optimization procedure is performed for the data vector of the current time instant and the data vector of the current time instant is then added to the look-up table (represented by the arrow labelled store) via a mapping block 430. Further, when any data vector of a previous time instant that is co-linear with the data vector of the current time instant cannot be found when the data vector of the current time instant is to be precoded, also the output vector of the current time instant is determined through the optimization procedure. According to a second alternative, the look-up table is predetermined. That is, in some embodiments, the optimization procedure is performed before any data vectors are precoded. A data vector of a previous time instant that is co-linear with the data vector of the current time instant can then always be found when the data vector of the current time instant is to be precoded. The arrow labelled output vector available represents the case where an output vector has been determined for the data vector of the current time instant (either by means of table look-up or by means of optimization).

To reduce the computational resources needed for performing the optimization procedure, the optimization procedure is in some examples performed only for a reduced subset of all possible data vectors. That is, in some embodiments, the optimization procedure is performed only for a reduced subset of all possible data vectors, yielding output vectors only for the reduced subset of all possible data vectors. In case the optimization procedure is performed only for a reduced subset of all possible data vectors, the output vectors for all possible data vectors can be found by being co-linear with the output vectors for the reduced subset of all possible data vectors. Further aspects of how to perform the optimization procedure only for a reduced subset of all possible data vectors will be disclosed below.

There could be different input parameters to the optimization procedure. In some non-limiting examples, the optimization procedure takes as input: the data vector of the current time instant, a set of candidate output vectors, channel state information per user 160a, 160b for the current time instant, a signal to noise ratio (SNR) target per user 160a, 160b for the current time instant, and a modulation allocation per user 160a, 160b for the current time instant. In the block diagrams of FIG. 3 and FIG. 4 the input parameters to the optimization procedure are represented by a SNR target and modulation allocation block and a CSI acquisition block.

In some aspects, the optimization procedure is constrained by in which constellation region the output vector is to be received. Below, the constraints on constellation regions will be referred to as constraints $C_1$ and $C_2$.

In some aspects, the optimization procedure involves determining constellation rotation or phase, denoted $\theta_j$, per user 160a, 160b for the current time instant. The rotation optimization needs to be performed once per coherence and, in contrast to the precoding, does not change from one symbol to the next.

An example embodiment where the look-up table is built on the fly as the data vectors are precoded into output vectors and where the optimization procedure does not involve determining constellation rotation will now be disclosed.

That is, in this example embodiment, the optimal constellation rotation for each user 160a, 160b is not found. One reason for this is that for each input data vector the optimal output vector can be found but the phase that is valid for all input data vectors is not found. The number of possible output vector calculations equals to $2^{\Sigma_j m_j}$ for each channel realization. However, according to this example embodiment the number of calculations can, by means of exploiting co-linearity, be reduced to one quarter without jeopardizing any achieved power savings or performance. Exploiting the constellation symmetry, the output vectors (x[n], x[m]) can be found by utilizing the relation, i.e., the co-linearity, between two data vectors (d[n], d[m]).

If $d[m]=\zeta \cdot d[n]$, where $\zeta \in \{1, -1, i, -i\}$, the output vectors should have the following relation $x[m]=\zeta \cdot x[n]$. Or, in other terms, if a previously precoded data vector d[m] can be found for which $d[m]=\zeta \cdot d[n]$, then the output vector of the current instant is determined as $x[n]=\zeta \cdot x[m]$.

The optimization problem for finding the output vector x[n] can be formulated as:

$$x[n] = \max_{x[n]} |x[n]|^2 \text{ such that}$$

$$C_1: R\{h_j x[n]\} \trianglelefteq R\{d_j[n]\}, \forall\, j \in K \text{ and}$$

$$C_2: I\{h_j x[n]\} \trianglelefteq I\{d_j[n]\}, \forall\, j \in K.$$

Here, the symbol "a⊴b" is used to denote that a vector a is in a certain quadrant b in the constellation diagram, where thus $b \in \{1, 2, 3, 4\}$.

As an example, assume that there are two users 160a, 160b and each one of the users is allocated constellation points using 4-QAM. The total number of all possible data vectors thus is 16, which results in solving either 16 optimization problems with 4 constraints or one optimization problem with 64 constraints. However, by means of exploiting co-linearity it is sufficient to consider four data vectors, as given by the set $F_{reduced}$, where:

$$F_{reduced} = \left\{ \sqrt{0.5}\begin{bmatrix} 1+1i \\ 1+1i \end{bmatrix}, \sqrt{0.5}\begin{bmatrix} 1+1i \\ 1-1i \end{bmatrix}, \sqrt{0.5}\begin{bmatrix} 1+1i \\ -1+1i \end{bmatrix}, \sqrt{0.5}\begin{bmatrix} 1+1i \\ -1-1i \end{bmatrix} \right\}.$$

The rest of the data vectors can be generated from $F_{reduced}$ through multiplying by the co-linearity factor $\zeta \in \{1, -1, i, -i\}$ and this will generate the full space (i.e. all possible symbol combinations) in the $F_{full}$ as:

$$F_{full} = \left\{ \sqrt{0.5}\begin{bmatrix} 1+1i \\ 1+1i \end{bmatrix}, \sqrt{0.5}\begin{bmatrix} 1+1i \\ 1-1i \end{bmatrix}, \sqrt{0.5}\begin{bmatrix} 1+1i \\ -1+1i \end{bmatrix}, \sqrt{0.5}\begin{bmatrix} 1+1i \\ -1-1i \end{bmatrix}, \right.$$

$$\sqrt{0.5}\begin{bmatrix} -1+1i \\ 1+1i \end{bmatrix}, \sqrt{0.5}\begin{bmatrix} -1+1i \\ 1-1i \end{bmatrix}, \sqrt{0.5}\begin{bmatrix} -1+1i \\ -1+1i \end{bmatrix}, \sqrt{0.5}\begin{bmatrix} -1+1i \\ -1-1i \end{bmatrix},$$

$$\sqrt{0.5}\begin{bmatrix} 1-1i \\ 1+1i \end{bmatrix}, \sqrt{0.5}\begin{bmatrix} 1-1i \\ 1-1i \end{bmatrix}, \sqrt{0.5}\begin{bmatrix} 1-1i \\ -1+1i \end{bmatrix}, \sqrt{0.5}\begin{bmatrix} 1-1i \\ -1-1i \end{bmatrix},$$

$$\left. \sqrt{0.5}\begin{bmatrix} -1-1i \\ 1+1i \end{bmatrix}, \sqrt{0.5}\begin{bmatrix} -1-1i \\ 1-1i \end{bmatrix}, \sqrt{0.5}\begin{bmatrix} -1-1i \\ -1+1i \end{bmatrix}, \sqrt{0.5}\begin{bmatrix} -1-1i \\ -1-1i \end{bmatrix} \right\}$$

This reduces the number of output vectors to be optimized, since it is sufficient to optimize with respect to $F_{reduced}$ rather than $F_{full}$.

Figure 5:
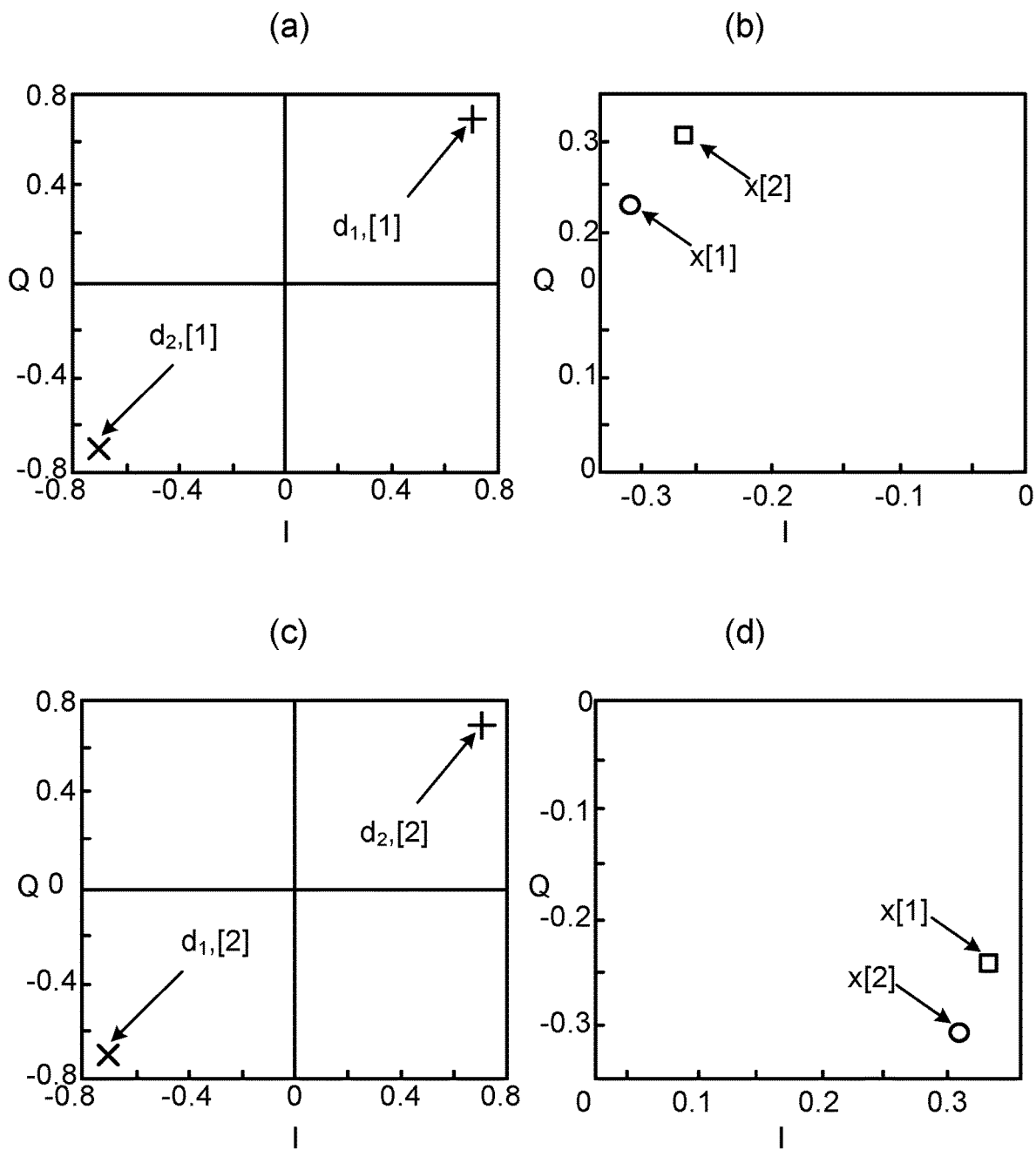
FIG. 5 shows constellation diagrams according to an embodiment.

A graphical explanation is depicted in the inphase (I) and Quadrature (Q) diagrams of FIG. 5. In this example, the input data vector is $$d[1] = \begin{bmatrix} d_1[1] \\ d_2[1] \end{bmatrix} = \sqrt{0.5}\begin{bmatrix} 1+1i \\ -1-1i \end{bmatrix}$$

as depicted in FIG. 5(a) and the corresponding output vector x[1] is shown in FIG. 5(b) where both output vector components $$\begin{bmatrix} x_1[1] \\ x_2[1] \end{bmatrix}$$

are located in the second quadrant. In FIG. 5(c) is depicted the input data vector $$d[2] = \begin{bmatrix} d_1[2] \\ d_2[2] \end{bmatrix} = \sqrt{0.5}\begin{bmatrix} -1-1i \\ 1+1i \end{bmatrix}$$

Hence, d[1]=−d[2]. The corresponding output vector x[2] can thus be determined as x[2]=−x[1]. The output vector x[2] is shown in FIG. 5(d) located in the fourth quadrant as x[2] is a reflection of x[1]. Further, if d[2]=±i d[1] this yields x[2]=±i x[1].

An example embodiment where the look-up table is predetermined and where the optimization procedure involves determining constellation rotation will now be disclosed.

Figure 6:
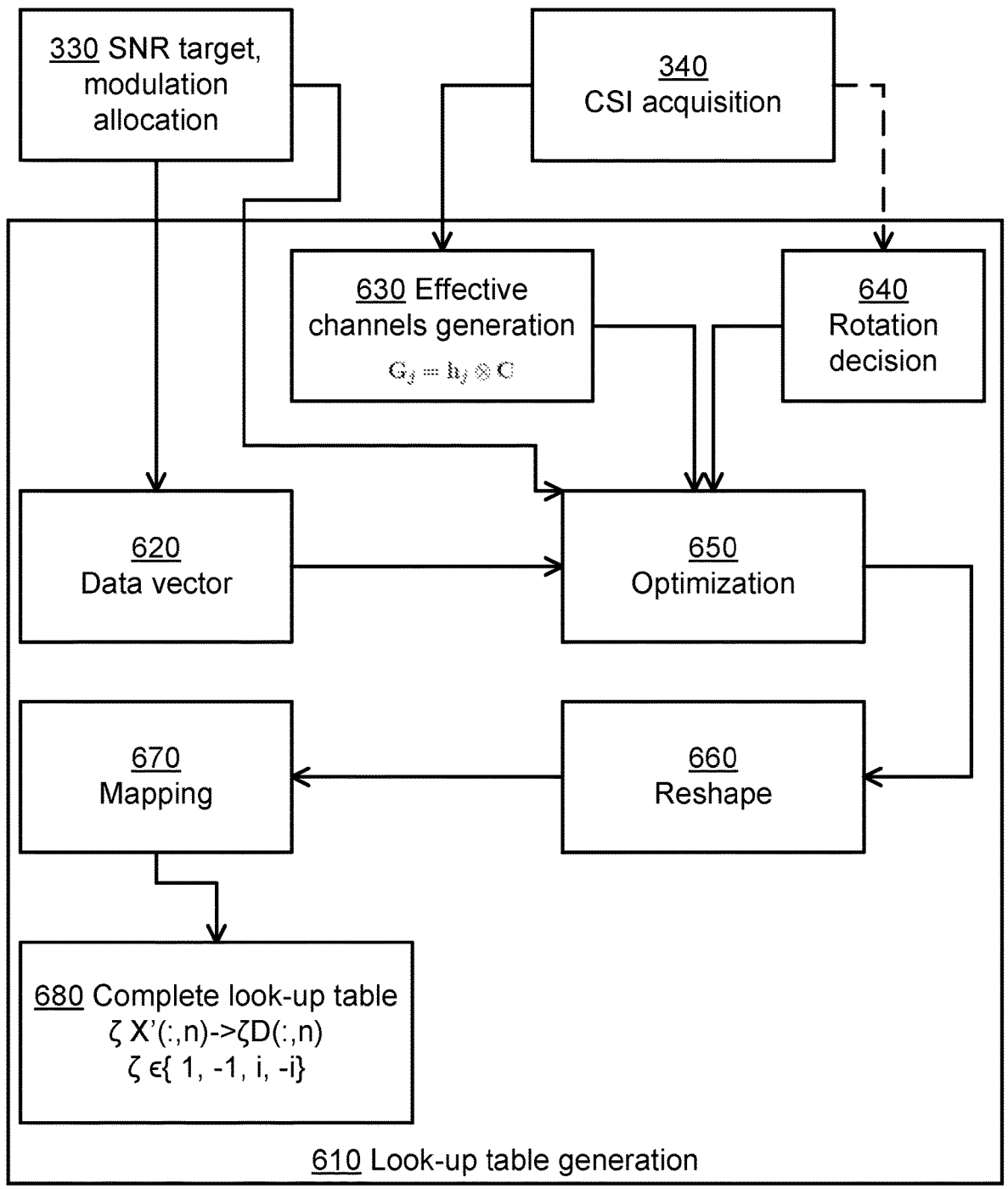

Reference is made to FIG. 6 which shows a block diagram for detailed look-up table generation in terms of a look-up table generation block 610. Input is provided from a SNR target and modulation allocation block 330 and from a CSI acquisition block 340 as in FIG. 3 and FIG. 4. Description of these blocks is therefore omitted.

Using the allocated modulation for each user, a data vector block 620 generates a reduced subset of possible data vectors. The reduced subset of possible data vectors, effective channel values, as generated by an effective channel generation block 630, and a constellation rotation decision (yes or no) as provided by a rotation decision block 640 are provided to an optimization block 650. The effective channel can be modelled as $G_j = h_j \otimes I_N$, $\forall j \in K$, where $I_N$ is the identity matrix of size N, where N is the number of included data vector in the optimization problem. Depending the rotation decision (yes or no), the optimization problem to be solved needs to be decided. In case of no rotation, the optimization is a quadratic problem with $2^{\Sigma_j m_j - 1}$ affine constraints. This optimization problem is a second-order cone programming optimization problem. In case of rotation, the optimization problem is quadratic with bilinear and constant modulus constraints. This problem can be solved using branch and bound combined with semidefinite programming.

The energy efficiency can be improved by either just optimizing the output vectors or jointly optimizing the output vector and the constellation rotation for each user. This allows for optimization of the phase $\theta_j$ for each user j that can be valid for all possible input data vectors possibilities as all these possibilities are included in a single optimization problem. However, the optimization needs only to be performed for a reduced subset of possible data vectors, conditioned that output vectors for the full set of all possible data vectors still can be generated. To guarantee that, the minimal subset from which the full space of the data vectors and output vectors needs to be identified. One example is the following subset:

$$F = \{d[n] | [d_1[n], \ldots, d_j[n], \ldots, d_K[n]]^T, d_m[n] \in Q_1, d_j[n] \in Q_u, \forall j \in K - \{m\}, \forall u \in \{1,2,3,4\}\}$$

The importance of constellation rotation comes from aligning the interfering symbols to push the correct symbols deeper in their correct detection regions, which makes the interference as additional energy source. Having such a reduced subset F only a single optimization problem with NK/2 rather than 2NK constraints needs to be solved (where N is the total number of available data vectors). The optimization problem for finding the output vector x[n] can thus be formulated as:

$$x[n] = \min_{x[n], \theta} \sum_{\{n \in N\}} \|x[n]\|^2 \text{ such that}$$

$$R\{\exp(i\theta_j) h_j x[n]\} \trianglelefteq R\{d_j[n]\}, I\{\exp(i\theta_j) h_j x[n]\} \trianglelefteq I\{d_j[n]\},$$

$$\forall d[n] \in F, \forall j \in K, \forall n \backslash N$$

In order to solve this optimization problem, all vectors x[n] can stacked in one single vector, $x_v$, as follows:

$$x_v = [x[1]^T, x[N]^T]^T$$

The optimization problem can then be expressed as:

$$x_v = \min_{x_v, \theta} x_v x_v^H \text{ such that}$$

$$R\{\exp(i\theta_j) G_j[n] x_v\} \trianglelefteq R\{d_j[n]\}, I\{\exp(i\theta_j) G_j[n] x_v\} \trianglelefteq I\{d_j[n]\},$$

$$\forall d[n] \in F, \forall j \in K, \forall n \backslash N$$

In turn, using semidefinite programming, the optimization problem can further be expressed as:

$$X = \min_{X, \theta} \text{trace}(X) \text{ such that}$$

$$R\{G_j[n] x_j\} \trianglelefteq R\{d_j[n]\}, I\{G_j[n] x_j\} \trianglelefteq I\{d_j[n]\},$$

$$X \triangleq x_j x_j^H, x_j = x_v \exp(i\theta_j)$$

$$\forall d[n] \in F, \forall j \in K, \forall n \backslash N$$

Thus, X is a semi-definite matrix. This optimization problem can be solved by using iterative branch and bound algorithm when the rank of X equals to 1. The solution will be the eigen vector of X with the maximum eigen value, and since it is rank one, there will be an eigen value which is not equal to zero. The matrix X can be decomposed as:

$$X = \lambda e \, e^H$$

Where $\lambda$ is the maximum eigen value and e is the eigen vector. The optimal value $x_v$ can be found as $x_v = \sqrt{\lambda} e$. The optimal phase $\theta_j$ for each user j can be solved using $\alpha_j = e^H x_j$, and then determining the phase as $\theta_j = \angle(\alpha_j)$. After output vectors x[n] are found for the reduced subset of possible data vectors, each data vector d[n] in the reduced subset of possible data vectors is reshaped in a reshape block 660. The reshape block 660 is configured to reassign each data vector to the corresponding output vector. In this respect, the solution represents the stacked concatenated version of the solution, and thus x[n] needs to be mapped to its respective data vector d[n]The thus reshaped subset of possible data vectors are then mapped, in a mapping block 670, to its corresponding output vector, and then output vectors for the rest of the data vectors (i.e., the data vectors excluded from the reduced subset) are determined, in a complete look-up table block 680, based on co-linearity. That is, if $d[m] = \zeta \cdot d[n]$, where $\zeta \in \{1, -1, I, -I\}$, the output vectors should be: $x[n] = f \cdot x[m]$.

Figure 7:
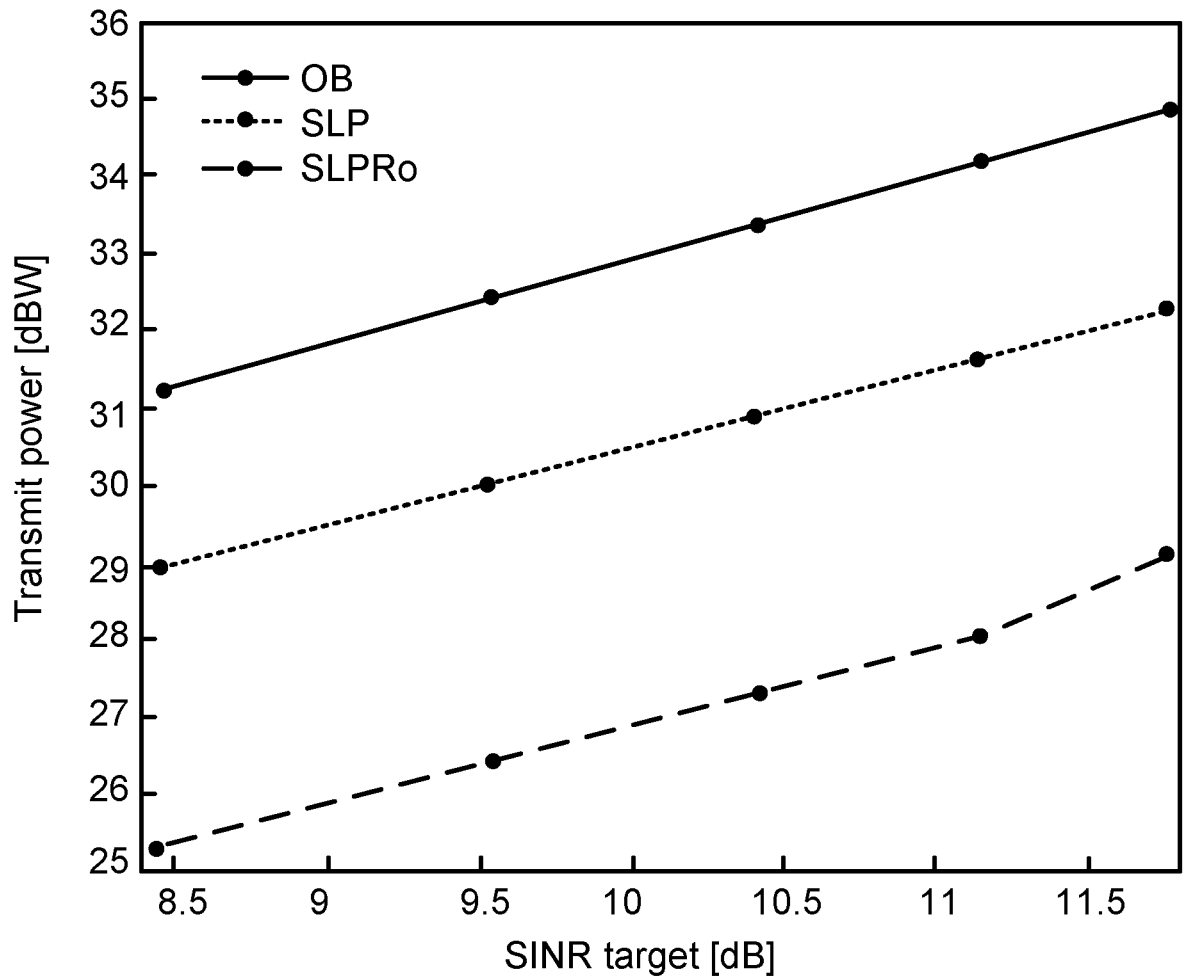
FIG. 7 shows simulation results according to embodiments.

Simulation results are shown in FIG. 7 for perfect channel state information fed back to the transmitter by the users. The number of antennas at the (radio) access network node is two and the number of users is two. A spatial correlation $|\alpha| = 0.9$ among the antennas at the (radio) access network node is assumed. In FIG. 7 is shown the transmit power required to achieve a certain signal to interference plus noise ratio (SINR) target at the receiver sides. A comparison of power saving that can achieved is made between optimal conventional beamforming, denoted OB, and symbol-level precoding according to the herein disclosed embodiments, denoted SLP and SLPRo. SLP denotes symbol-level precoding without rotation optimization and SLPRo denotes joint optimization of the output vectors and the phase rotation. It can be seen that the herein disclosed and symbol-level precoding outperforms conventional precoding. The power saving of SLP is around 2.1 dB in comparison with OB, and SLPRo has power saving around 5.9 dB and 3.8 dB in comparison with OB and SLP respectively. SLPRo optimizes the phases by which each user receives its data and the output vectors, which increases the chances of having constructive interference.

In summary, the problem of power consumption in the downlink of multiuser MISO system and the issue of complexity resulted from high number of constraints or number of optimization problems have been addressed.

Firstly, the herein disclosed embodiments enable a reduction of the required computations through either reducing the number of constraints or the number of optimization problem to be solved. By exploiting the constellations symmetry, the number of the input data vectors for which the respective output vectors need to be optimized can be cut to one quarter. This can reduce the algorithm complexity to a quarter, and therefore, less execution time and computational power are needed without losing any achieved transmit power saving in comparison to traditional SLP schemes.

Secondly, the herein disclosed embodiments enable the energy efficiency to be increased by enabling constellation rotation optimization for each user. This improves the interference exploitation at the users by aligning the interfering symbols more efficiently to push the signal deeper in the correct detection. In order to exploit multiuser interference and transforming it into useful power at the receiver side, symbol-level precoding is utilized through a joint exploitation of data information and the channel state information.

According to herein disclosed embodiments a joint optimization of the transmit symbol-level precoding and the constellation rotation of the data information for each user is enabled. One purpose of the constellation rotation is to increase the probability of having constructive interference, and thus better energy efficiency performance. Optimized phase rotation changes with CSI, but the output vector changes with input data vector. Each user can be informed of, or estimate, this phase rotation for its constellation to guarantee the correct detection of the delivered data. Therefore, no additional processing at the receiver side is required.

Figure 8:
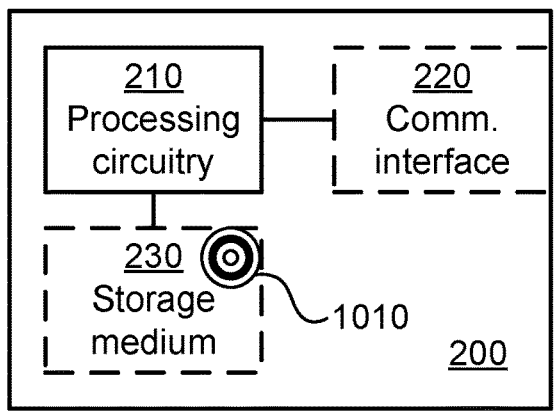
FIG. 8 is a schematic diagram showing functional units of a network node according to an embodiment.

FIG. 8 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, functions, nodes, and devices of the communications network 100. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 9:
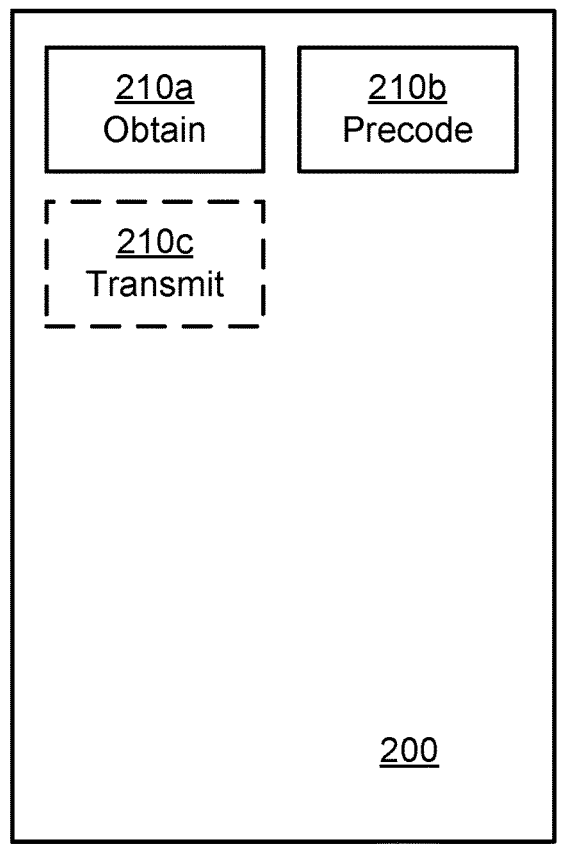
FIG. 9 is a schematic diagram showing functional modules of a network node according to an embodiment.

FIG. 9 schematically illustrates, in terms of a number of functional modules, the components of a network node 200 according to an embodiment. The network node 200 of FIG. 9 comprises a number of functional modules; an obtain module 210a configured to perform step S102 and a precode module 210b configured to perform step S104. The network node 200 of FIG. 9 may further comprise a number of optional functional modules, such as a transmit module 210c configured to perform step S106. In general terms, each functional module 210a-210c may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 210a-210c may be implemented by the processing circuitry 210, possibly in cooperation with the communications interface 220 and/or the storage medium 230. The processing circuitry 210 may thus be configured to from the storage medium 230 fetch instructions as provided by a functional module 210a-210c and to execute these instructions, thereby performing any steps as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 8 the processing circuitry 210 may be distributed among a plurality of devices, or nodes. The same applies to the functional modules 210a-210c of FIG. 9 and the computer program 1020 of FIG. 10.

Figure 10:
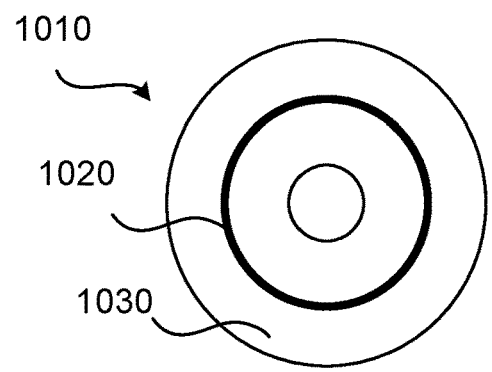
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

Figure 11:
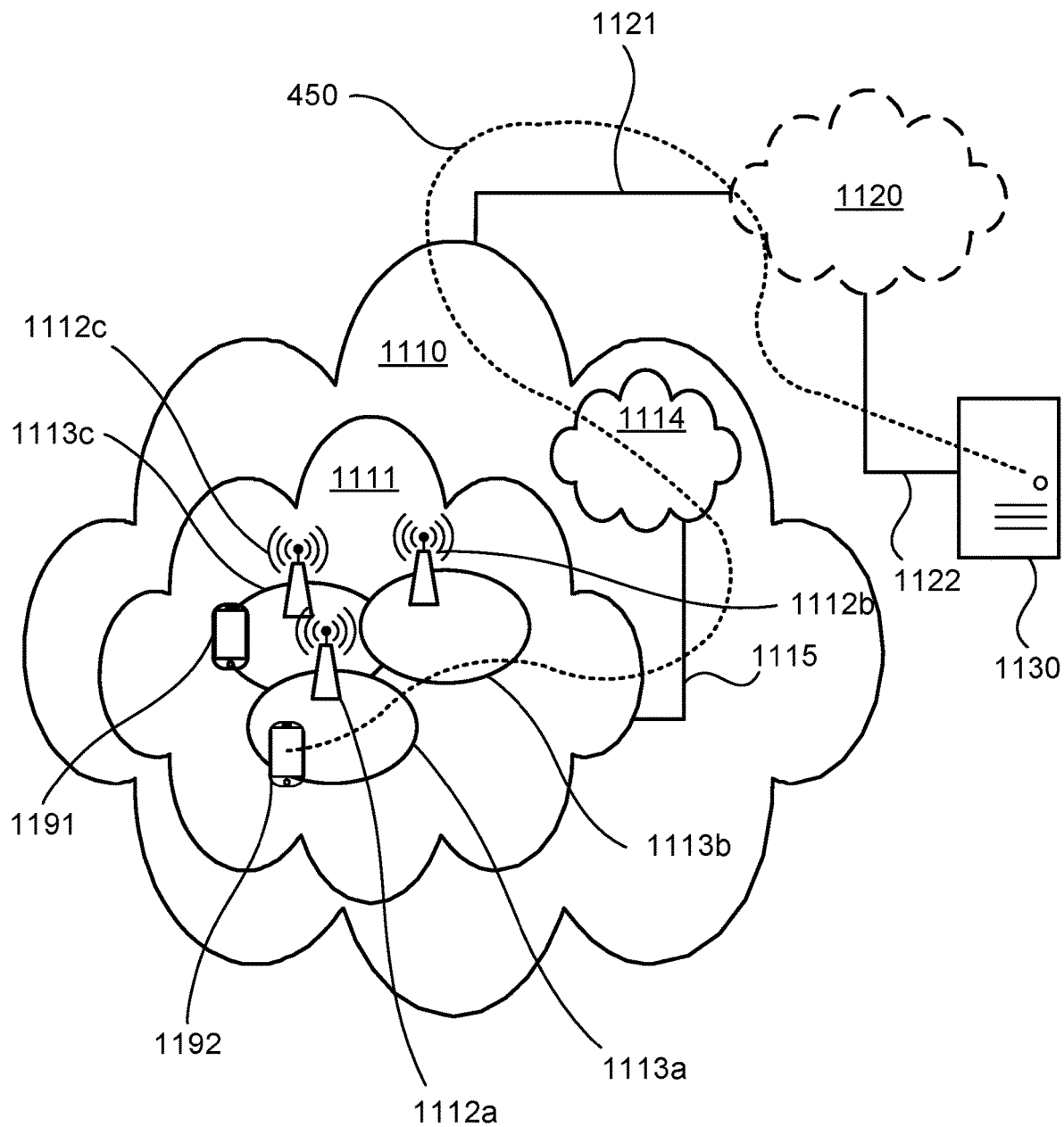
FIG. 11 is a schematic diagram illustrating a telecommunication network connected via an intermediate network to a host computer in accordance with some embodiments.

FIG. 11 is a schematic diagram illustrating a telecommunication network connected via an intermediate network 1120 to a host computer 1130 in accordance with some embodiments. In accordance with an embodiment, a communication system includes telecommunication network 1110, such as a 3GPP-type cellular network, which comprises access network 1111, such as (radio) access network no in FIG. 1, and core network 1114, such as core network 120 in FIG. 1. Access network 1111 comprises a plurality of radio access network nodes 1112a, 1112b, 1112c, such as NBs, eNBs, gNBs (each corresponding to the network node 200 of FIG. 1) or other types of wireless access points, each defining a corresponding coverage area, or cell, 1113a, 1113b, 1113c. Each radio access network nodes 1112a, 1112b, 1112c is connectable to core network 1114 over a wired or wireless connection 1115. A first UE 1191 located in coverage area 1113c is configured to wirelessly connect to, or be paged by, the corresponding network node 1112c. A second UE 1192 in coverage area 1113a is wirelessly connectable to the corresponding network node 1112a. While a plurality of UE 1191, 1192 are illustrated in this example, the disclosed embodiments are equally applicable to a situation where a sole UE is in the coverage area or where a sole terminal device is connecting to the corresponding network node 1112. The UEs 1191, 1192 correspond to the users 160a, 160b of FIG. 1.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, network node 1112 may not or need not be informed about the past routing of an incoming downlink communication with data originating from host computer 1130 to be forwarded (e.g., handed over) to a connected UE 1191. Similarly, network node 1112 need not be aware of the future routing of an outgoing uplink communication originating from the UE 1191 towards the host computer 1130.

Figure 12:
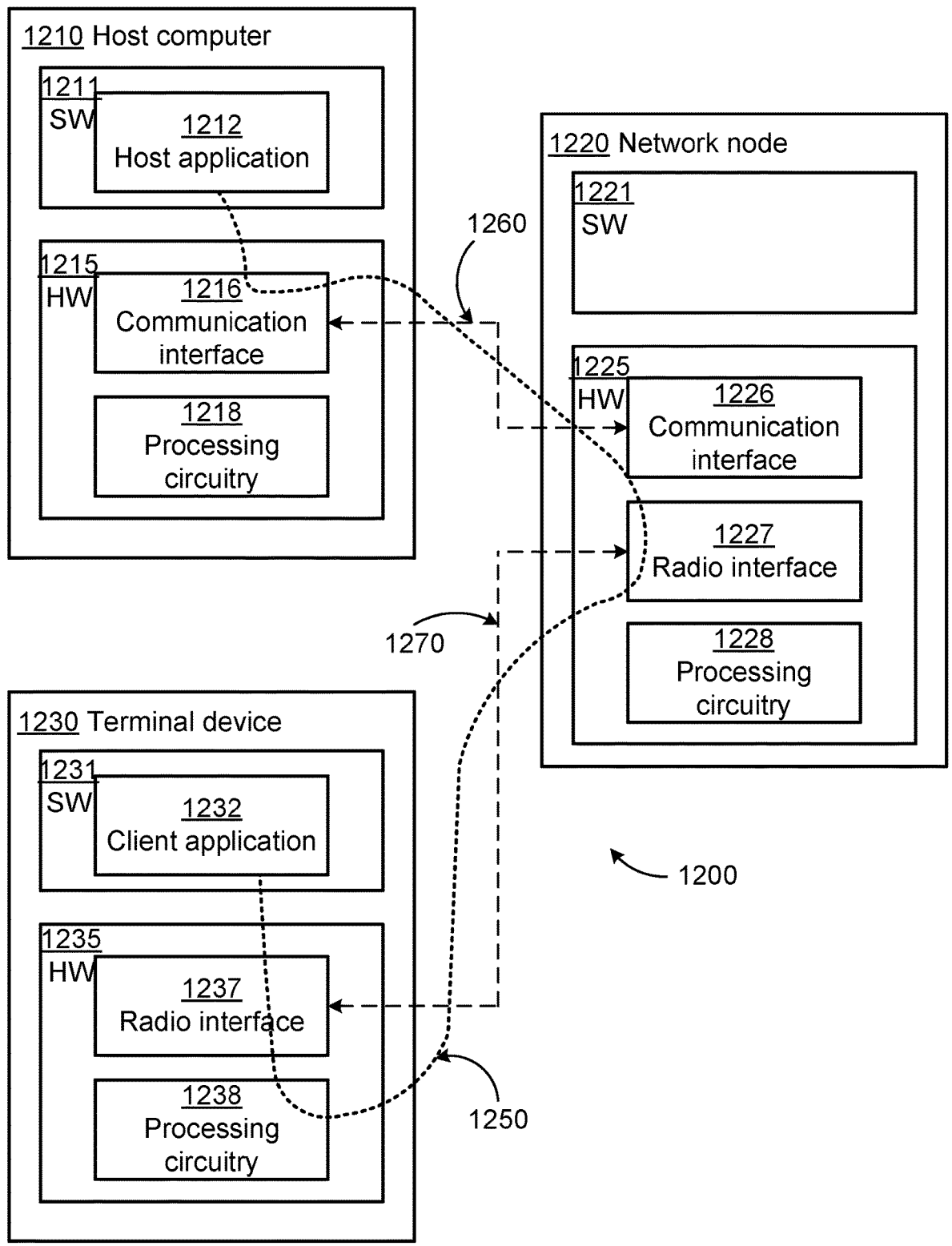
FIG. 12 is a schematic diagram illustrating host computer communicating via a radio base station with a terminal device over a partially wireless connection in accordance with some embodiments.

FIG. 12 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. The UE 1230 corresponds to the users 160a, 160b of FIG. 1. In providing the service to the remote user, host application 1212 may provide user data which is transmitted using OTT connection 1250.

Communication system 1200 further includes radio access network node 1220 provided in a telecommunication system and comprising hardware 1225 enabling it to communicate with host computer 1210 and with UE 1230. The radio access network node 1220 corresponds to the network node 200 of FIG. 1. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by radio access network node 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of radio access network node 1220 further includes processing circuitry 1228, which may comprise one or more programmable processors, application-specific integrated circuits, field programmable gate arrays or combinations of these (not shown) adapted to execute instructions. Radio access network node 1220 further has software 1221 stored internally or accessible via an external connection.

Communication system 1200 further includes UE 1230 already referred to. Its hardware 1235 may include radio interface 1237 configured to set up and maintain wireless connection 1270 with a radio access network node serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

It is noted that host computer 1210, radio access network node 1220 and UE 1230 illustrated in FIG. 12 may be similar or identical to host computer 430, one of network nodes 412a, 412b, 412c and one of UEs 491, 492 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via network node 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and radio access network node 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect network node 1220, and it may be unknown or imperceptible to radio access network node 1220. Such procedures and functionalities may be known and practiced in the art. In certain embodiments, measurements may involve proprietary UE signaling facilitating host computer's 1210 measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for downlink symbol-level precoding as part of multiuser multiple-input single-output, MISO, communication, the method being performed by a network node, the method comprising:

obtaining a data vector, d[n], of a current time instant, n, to be precoded, wherein the data vector comprises data symbols, $d_1[n], \ldots, d_K[n]$, for K>1 users, and wherein the current time instant corresponds to a single symbol; and precoding the obtained data vector by determining an output vector, x[n], for the data vector of the current time instant n, wherein, determining the output vector for the current time instant comprises searching for a data vector d[m] of a previous time instant, m, that is co-linear with the data vector of the current time instant according to a co-linearity factor, and when such a data vector of the previous time instant is found, the output vector is equal to an output vector x[m] of the previous time instant multiplied with the co-linearity factor.

2. The method according to claim 1, further comprising: transmitting the output vector of the current time instant in the downlink.

3. The method according to claim 1, wherein the data vector of the previous time instant is co-linear with the data vector of the current time instant when the data vector of the current time instant is equal to the co-linearity factor, z, multiplied with the data vector of the previous time instant.

4. The method according to claim 1, wherein the co-linearity factor takes a value in a set Z={1, −1, i, −i}.

5. The method according to claim 1, wherein the data vector of the previous time instant is searched for among data vectors in a look-up table.

6. The method according to claim 5, wherein the output vectors are, together with their respective data vectors, added to the look-up table upon having been determined through an optimization procedure.

7. The method according to claim 6, wherein the optimization procedure takes as input: the data vector of the current time instant, a set of candidate output vectors, channel state information per user for the current time instant, a signal to noise ratio target per user for the current time instant, and a modulation allocation per user for the current time instant.

8. The method according to claim 6, wherein the optimization procedure is constrained by in which constellation region the output vector is to be received.

9. The method according to claim 6, wherein the optimization procedure involves determining constellation rotation, $\delta$, per user for the current time instant.

10. The method according to claim 6, wherein the optimization procedure is performed only for a reduced subset of all possible data vectors, yielding output vectors only for the reduced subset of all possible data vectors.

11. The method according to claim 10, wherein the output vectors for all possible data vectors are found by being co-linear with the output vectors for the reduced subset of all possible data vectors.

12. The method according to claim 6, wherein the optimization procedure is performed as the data vectors are precoded when any data vector of a previous time instant that is co-linear with the data vector of the current time instant cannot be found when the data vector of the current time instant is to be precoded.

13. The method according to claim 12, wherein the output vector of the current time instant is determined through the optimization procedure.

14. The method according to claim 6, wherein the optimization procedure is performed before any data vectors are precoded, and wherein when a data vector of a previous time instant that is co-linear with the data vector of the current time instant always can be found when the data vector of the current time instant is to be precoded.

15. A network node for downlink symbol-level precoding as part of multiuser MISO communication, the network node comprising processing circuitry, the processing circuitry being configured to cause the network node to:
obtain a data vector, d[n], of a current time instant, n, to be precoded, wherein the data vector comprises data symbols, $d_1[n], \ldots, d_K[n]$, for K>1 users, and wherein the current time instant corresponds to a single symbol; and
precode the obtained data vector by determining an output vector, x[n], for the data vector of the current time instant n, wherein, determining the output vector for the current time instant comprises searching for a data vector d[m] of a previous time instant, m, that is co-linear with the data vector of the current time instant according to a co-linearity factor, and when such a data vector of the previous time instant is found, the output vector is equal to an output vector x[m] of the previous time instant multiplied with the co-linearity factor.

16. The network node according to claim 15, further being configured to:
transmit the output vector of the current time instant in the downlink,
wherein the data vector of the previous time instant is co-linear with the data vector of the current time instant when the data vector of the current time instant is equal to the co-linearity factor, $\xi$, multiplied with the data vector of the previous time instant.

17. A computer program product for downlink symbol-level precoding as part of multiuser MISO communication, the computer program product comprising a non-transitory computer readable storage medium storing computer code which, when run on processing circuitry of a network node, causes the network node to:
obtain a data vector, d[n], of a current time instant, n, to be precoded, wherein the data vector comprises data symbols, $d_1[n], \ldots, d_K[n]$, for K>1 users, and wherein the current time instant corresponds to a single symbol; and
precode the obtained data vector by determining an output vector, x[n], for the data vector of the current time instant n, wherein, determining the output vector for the current time instant comprises searching for a data vector d[m] of a previous time instant, m, that is co-linear with the data vector of the current time instant according to a co-linearity factor, and when such a data vector of the previous time instant is found, the output vector is equal to an output vector x[m] of the previous time instant multiplied with the co-linearity factor.

* * * * *